(12) United States Patent
Delavy et al.

(10) Patent No.: US 12,287,675 B2
(45) Date of Patent: Apr. 29, 2025

(54) DISPLAY MODULE, DISPLAY SYSTEM WITH DISPLAY MODULES AND METHOD FOR OPERATING THE DISPLAY SYSTEM

(71) Applicant: Dynavisual AG, Zug (CH)

(72) Inventors: Marcel Delavy, Zürich (CH); Roman Paysen-Petersen, Eglisau (CH); Nicola Ramagnano, Rapperswil (CH); Heinz Christian Mathis, Uerikon (CH)

(73) Assignee: Dynavisual AG, Zug (CH)

( * ) Notice: Subject to any disclaimer, the term of this patent is extended or adjusted under 35 U.S.C. 154(b) by 0 days.

(21) Appl. No.: 18/374,534

(22) Filed: Sep. 28, 2023

(65) Prior Publication Data
US 2024/0241543 A1    Jul. 18, 2024

(30) Foreign Application Priority Data

Jan. 18, 2023 (WO) ................. PCT/EP2023/051140
Aug. 30, 2023 (EP) ..................................... 23194322

(51) Int. Cl.
*G09G 5/00* (2006.01)
*G06F 1/16* (2006.01)
*H04M 1/02* (2006.01)

(52) U.S. Cl.
CPC ........ *G06F 1/1652* (2013.01); *H04M 1/0268* (2013.01)

(58) Field of Classification Search
CPC ...... G06F 1/1652; G06F 1/163; G06F 1/1656; G06F 3/0412; H04M 1/0202
USPC ....................................................... 345/156
See application file for complete search history.

(56) References Cited

U.S. PATENT DOCUMENTS

| | | | |
|---|---|---|---|
| 7,697,925 B1 | 4/2010 | Wilson et al. | |
| 2009/0167483 A1 | 7/2009 | Jones et al. | |
| 2013/0100701 A1* | 4/2013 | Wang He | G02B 6/0038 362/621 |
| 2013/0162427 A1 | 6/2013 | Dibenedetto et al. | |

(Continued)

FOREIGN PATENT DOCUMENTS

| | | |
|---|---|---|
| CN | 215913446 U | 3/2022 |
| EP | 3 307 025 A1 | 4/2018 |
| WO | 2014/096861 A2 | 6/2014 |

OTHER PUBLICATIONS

European Partial Search Report received in corresponding Application No. EP 23194322.6, dated Feb. 29, 2024, in 26 pages, with translation.

(Continued)

*Primary Examiner* — Jennifer T Nguyen
(74) *Attorney, Agent, or Firm* — Procopio, Cory, Hargreaves & Savitch LLP

(57) ABSTRACT

Display module having a flexible display unit and a housing having a rear side and a front side, the flexible display unit being arranged on the front side of the housing, characterized in that the housing has a plurality of interior spaces for accommodating electronic components, in that the housing is flexible at least along boundaries of the interior spaces in that the housing has recesses on the rear side which extend at least partially over the rear side, as a result of which the housing with the display unit can be bent within a predefined angular range along the recesses. Furthermore, a use of the display module, a display system comprising a plurality of display modules, and a method of operating a display system are disclosed.

10 Claims, 5 Drawing Sheets

(56) References Cited

U.S. PATENT DOCUMENTS

| | | |
|---|---|---|
| 2014/0009366 A1 | 1/2014 | Chang |
| 2014/0091689 A1* | 4/2014 | Mishan .................. H04M 1/21 |
| | | 312/223.1 |
| 2014/0099479 A1* | 4/2014 | Krall .................. H04M 1/0269 |
| | | 428/174 |
| 2014/0193037 A1 | 7/2014 | Stitzinger et al. |
| 2015/0141088 A1* | 5/2015 | Hosoi ..................... H04M 1/05 |
| | | 455/575.1 |
| 2015/0378391 A1 | 12/2015 | Huitema et al. |
| 2016/0327987 A1* | 11/2016 | Huitema .............. G04G 17/045 |
| 2016/0357222 A1 | 12/2016 | Seo et al. |
| 2017/0090848 A1 | 3/2017 | Tomita et al. |
| 2017/0199712 A1 | 7/2017 | Lee |
| 2018/0032107 A1* | 2/2018 | Cho ...................... G06F 1/1652 |
| 2022/0047021 A1 | 2/2022 | Witchey et al. |

OTHER PUBLICATIONS

International Search Report and Written Opinion received in corresponding International Application No. PCT/EP2023/051140, dated Jul. 7, 2023, in 12 pages.

Hatchett, Jonathan, et al.: "Displaying detail in bright environments: A 10,000 nit display and its evaluation", Signal Processing Image Communication, Bd. 76, 1. Aug. 2019 (Aug. 1, 2019), Seiten 125-134, XP055695310, NL ISSN: 0923-5965, DOI: 10.1016/j.image.2019.04.011, in 15 pages.

* cited by examiner

DISPLAY MODULE, DISPLAY SYSTEM WITH DISPLAY MODULES AND METHOD FOR OPERATING THE DISPLAY SYSTEM

CROSS-REFERENCE TO RELATED APPLICATIONS

This application claims the benefit of EP Application No. 23194322.6, filed Aug. 30, 2023, and International Application No. PCT/EP2023/051140, filed Jan. 18, 2023, and which claims the benefit of the contents of which are incorporated by reference.

TECHNICAL FIELD

The present invention relates to a display module according to the pre-characterizing part of claim 1, a use of the display module, a display system comprising a plurality of display modules, and a method for operating the display system.

STATE OF THE ART

Recent developments have brought about flexible displays that enable new applications with a bendable display. However, it is often a problem to find the right device mechanics to stabilize the flexible displays and protect them against damage during folding and rolling. In addition, special precautions must be taken if a flexible display is to be equipped with all the necessary components to be used as an independent display module.

DESCRIPTION OF THE INVENTION

It is therefore an object of the present invention to provide a display module with a flexible display unit, which is compact and robustly built, and at the same time flexibly bendable.

This object is solved by the features indicated in the characterizing part of claim 1. Further embodiments of the display module according to the invention, a use of the display module, a display system with a plurality of display modules, and a method for operating the display system are defined by further claims.

The display module according to the invention comprises a flexible display unit and a housing having a rear side and a front side, wherein the flexible display unit is arranged on the front side of the housing. The display module according to the invention is characterized in that the housing has a plurality of interior spaces for accommodating electronic components, that the housing is flexible at least along boundaries of the interior spaces in that the housing has recesses on the rear side which extend at least partially over the rear side, whereby the housing with the display unit is bendable within a predefined angular range along the recesses.

One embodiment of the display module according to the invention is that the recesses extend over the entire rear side of the housing.

Further embodiments of the display module according to the invention comprise that the housing is rectangular and that the recesses run parallel to side walls of the housing, preferably with the interior spaces being of equal size.

This achieves a uniform, segmental bending of the housing.

Further embodiments of the display module according to the invention comprise that the recesses form a matrix with two rows and three columns on the rear side of the housing with corresponding interior spaces, the interior spaces preferably being of equal size.

Further embodiments of the display module according to the invention comprise that the recesses have a depth corresponding to 50% to 90%, preferably 60% to 80%, preferably 75% of an average thickness of the housing.

Further embodiments of the display module according to the invention comprise that the recesses on the rear side have a width that allows a maximum bending angle of the front side of the housing of 35°.

Further embodiments of the display module according to the invention comprise that the interior spaces accommodate at least one of the following components:
electronic components;
battery;
where the components can be connected by means of flexible prints.

Further embodiments of the display module according to the invention comprise that at least one of the following functions are realized:
Wireless data transmission, for example, according to the Wifi standard 2.4 GHZ;
Bluetooth Low Energy with pairing option to multiple devices equipped with Bluetooth interfaces;
Three-axis gyroscope;
Three-axis accelerometer;
Gesture recognition, including support from machine-learning algorithms;
Microphone for sound recording and processing using machine-learning algorithms;
Cryptographic co-processor for secure encryption and transmission of data;
Data storage;
Infrared precision location, preferably indoors;
USB-C charging port for the batteries 15;
4G and/or 5G communication modules for mobile communication over existing public or private communication networks;
Temperature sensors.

Further embodiments of the display module according to the invention comprise that the maximum brightness of the display unit is 6,400 candela per square meter.

The invention further relates to a use of the display module for wearing in caps, wristbands, helmet covers, clothing, safety vests, work clothes, and other textiles that allow the attachment of a carrying bag or system. For example, the display module is worn in a pocket made of transparent or partially transparent textile, whereby the information displayed on the display module is visible through the textile.

Furthermore, the invention relates to a display system comprising
a plurality of display modules, each having a flexible display unit, at least one infrared unit, a control unit, a data transmission unit and a power supply unit, wherein in each display module the display unit, the at least one infrared unit, the control unit, the data transmission unit and the power supply unit are operatively connected to one another,
a central processing unit,
at least one data transmission unit which, on the one hand, is operatively connected to the central computing unit and, on the other hand, to the data transmission unit of the display module, at least temporarily, where
- each display module is assigned a unique identification code which can be transmitted with an infrared signal emitted by the at least one infrared unit,
- at least one image acquisition unit is provided for acquiring the infrared signals emitted with the infrared units,
- the at least one image acquisition unit is operatively connected to the central processing unit, in which the positions of the individual display modules can be determined, and
- the central computing unit has a data memory with image data which is processed at least in part and as a function of the position of the display modules and transmitted to the latter for setting the brightness and/or color of the corresponding display unit.

A further embodiment of the display system according to the invention is to arrange a bandpass filter in front of the image acquisition unit, whereby the bandpass filter primarily transmits infrared signals with wavelengths in the range of 700 nm to 1400 nm.

Finally, the present invention comprises a method for operating a display system, the method comprising the steps of:
- emitting an infrared signal generated with an infrared unit of the display module, comprising a modulated identification code unique to the respective display module,
- capturing the infrared signal with an image capture unit,
- determining a current position of the display module,
- determining a brightness value and/or a color value of a display module based on the current position and based on stored image data,
- transferring the brightness values and/or the color values to the respective display module,
- setting the brightness values and/or the color values in the display module.

A further embodiment of the method according to the invention is characterized by filtering signals with a bandpass filter prior to acquisition with the image acquisition unit, whereby the band-pass filter primarily passes infrared signals with wavelengths in the range of 700 nm to 1400 nm.

Further embodiments of the method according to the invention comprise that the step for determining the instantaneous position of the display module comprises the following:
- generating a sequence of images from a video sequence captured with the image acquisition units,
- calculating of the cross correlation between a synchronization sequence and values of an image point,
- comparing the calculated cross-correlation with a given threshold,
- selecting of the image points that have a cross-correlation value above the specified threshold, extracting the message sequences at the selected pixels,
- generating for each detected pixel the pixel coordinates, a corresponding message sequence and an estimated signal amplitude.

Still further embodiments of the method according to the invention consist in that the step of determining a brightness value and/or a color value of a display module on the basis of the instantaneous position and on the basis of stored image data comprises the following:
- converting image point coordinates into position coordinates of a display module within a projection surface using a homography mapping, and
- assigning of a brightness value and/or a color value at the position coordinates of the display module based on stored image data.

The mentioned embodiments of the present invention can be combined in any way. Only those combinations are excluded which would lead to a contradiction by a combination.

BRIEF DESCRIPTION OF THE FIGURES

Examples of embodiments of the present invention are explained in further detail below with reference to figures. These are for explanatory purposes only and are not to be construed restrictively. The figures show FIG. 1 an explosive perspective view of a display module according to the invention, FIG. 2 the assembled display module according to FIG. 1 in perspective view, FIG. 3 a detailed view of the display module 1 according to the invention in the area of a recess, looking parallel to a longitudinal axis of the recess, FIG. 4 a top view of a front side of the display module according to FIGS. 1 to 3 with infrared units for locating in an interior area, FIG. 5 the display module according to the invention in a bent or folded state, FIG. 6 a display system according to the invention with several display modules according to the invention, FIG. 7 a block diagram of a display module according to the invention and FIG. 8 a flow chart with method steps according to the invention for determining the position of a display module.

DETAILED DESCRIPTION OF THE INVENTION

Figure 1:
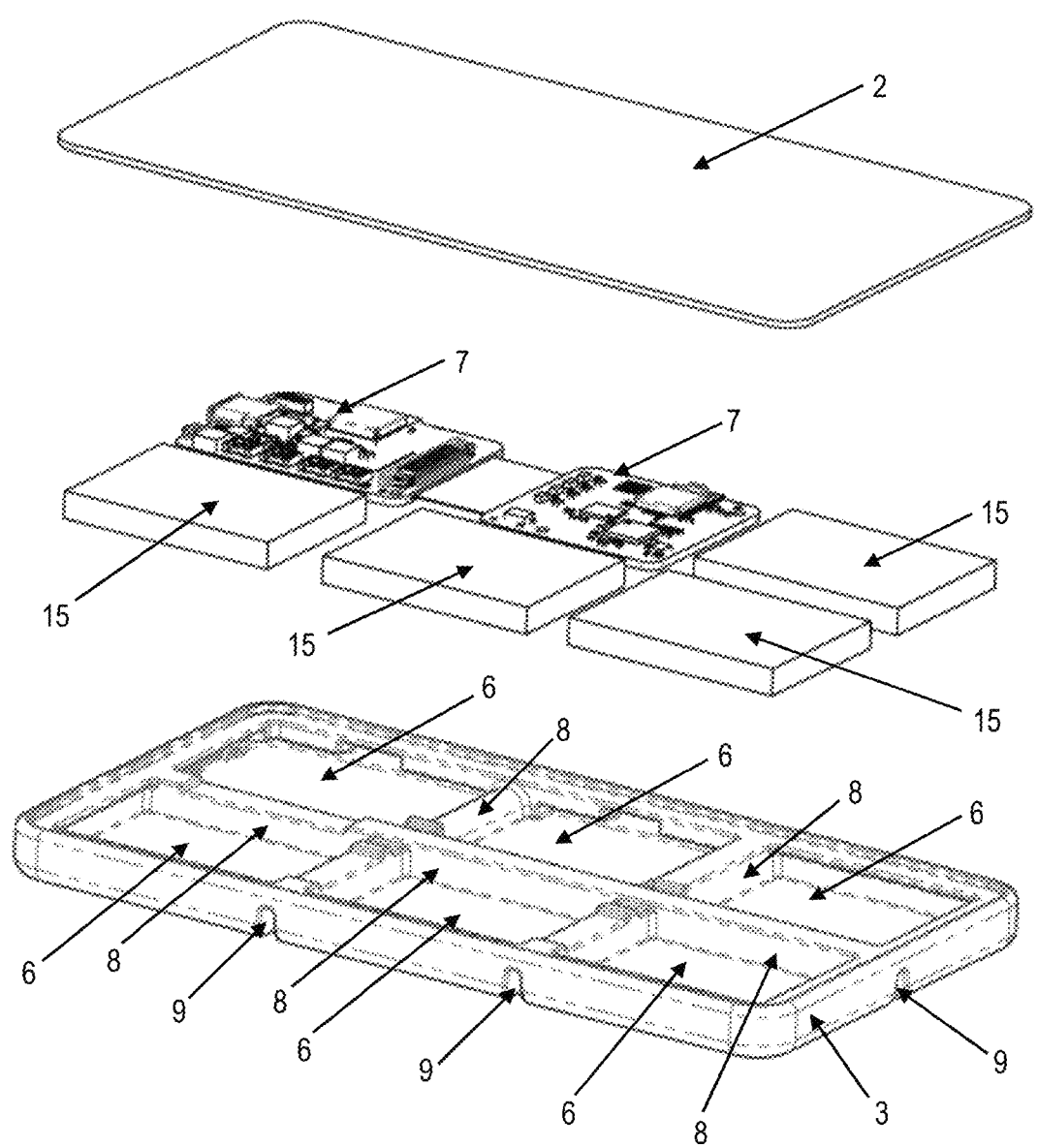

FIG. 1 shows a display module 1 according to the invention in perspective exploded view, in which a housing 3, several components 7, 15 and a display unit 2 are shown. It is of importance that the display module 1 according to the invention can be operated independently of other components. This means that the display module 1 according to the invention is autonomous with respect to the processing of data as well as with respect to the power supply. The display module 1 according to the invention is thus not location-bound. Nevertheless, the display module 1 according to the invention is equipped in such a way that it can be controlled or supplied with data from outside or can transmit data to a superordinate server unit. The communication means required for this will be explained in detail.

In the illustrated embodiment of the present invention, the housing 3 is molded from a single piece, for which purpose a rubber-elastic polymer (elastomer) is used, such as a polyurethane, in which a desired hardness can be set by admixing an extender. It has been found that the desired hardness should be, for example, in the range of 60 to 100 Shore A, preferably equal to 80 Shore A.

The interior of the housing 3 according to the invention is divided into interior spaces 6, which can accommodate components such as electronic components 7 and batteries 15. Since the components 7, 15 often have a certain rigidity, the housing 3 can be bent only slightly in the region of the interior spaces 6. According to the invention, recesses 9 are therefore provided on a rear side 4 of the housing 3 in the region of boundaries 8 of the interior spaces 6 with a depth 11 which corresponds, for example, to 50% to 90%, preferably 60% to 80%, preferably 75% of a mean thickness 12 of the housing 2. The average thickness 12 results from the outer dimensions of the mounted display module 1 from the display unit 2 mounted on a front side 5 to the rear side 4 of the housing 2.

Figure 3:
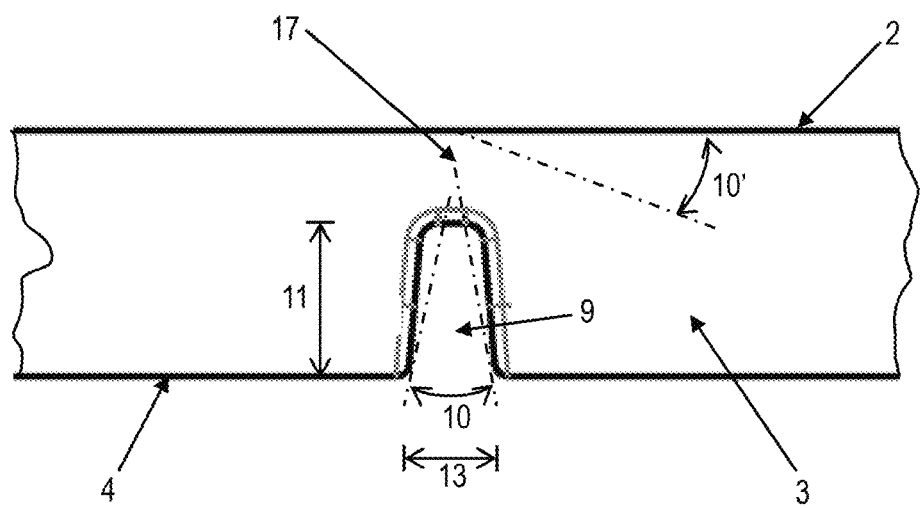

The maximum bending of the display module 1 or of the housing 3 in the area of the boundaries 8 of the interior spaces 6 or of the recesses 9 is further adjusted by a width 13 of the recess 9 (see also FIG. 3). Thus, the width 13 on a plane of the rear side of the housing 3 is selected in such a way that a maximum bending angle 14 of 35° can be achieved, i.e. the display module 1 or the housing 2 can be bent by a maximum of 35° at a recess 9 with respect to a relaxed starting position.

As can be seen from FIG. 1, the recesses 9 extend over the entire rear side 4 of the housing 3. In a further embodiment of the present invention, it is also conceivable that the recesses 9 are interrupted by bars (not shown). This limits the bending capacity for a certain hardness of the material used for the housing 3, but increases the strength or robustness.

The display module 1 shown in the figures and thus the housing 3 are rectangular with recesses 9 running parallel to the side walls of the housing 3. In further embodiments of the present invention, it is also conceivable that the display module 1 or the housing 3 is any polygon. Accordingly, the recesses can also extend in any desired manner.

Furthermore, the recesses 9 in the housing 3 shown in FIG. 1 extend in such a way that two rows and three columns of interior spaces 6 are formed in the housing 3. Accordingly, the display module 1 or the housing 3 can be bent in sections. Although a regular arrangement of the recesses 9—and thus equally large interior spaces 6—is preferred in one embodiment of the present invention, it is not a necessity. In a further embodiment, any arrangement of the recesses 9 is conceivable.

Figure 2:
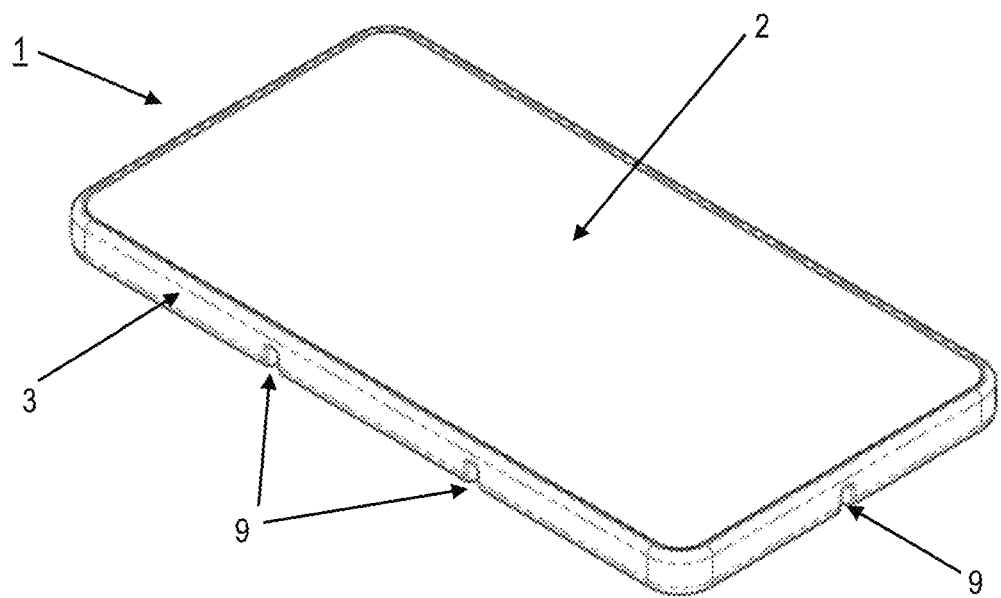

FIG. 2 shows a perspective view of the display module 1 according to the invention in fully assembled form.

FIG. 3 shows a detailed view of the display module 1 in the area of a recess 9, looking parallel to a longitudinal axis of the recess 9. As has already been explained, the recess 9 has a width 13 and a depth 11 on a plane of the rear side 4 of the housing 3. Through this and depending on the elasticity of the material used for the housing 3, the angular range 10 becomes adjustable. Starting from a vertex 17, the position of which is assumed to be midway between the maximum depth 11 of the recess 9 and the display unit 2, the maximum angular range 10 about which the display unit 2 can be bent is apparent, as indicated by the angle 10' indicated by dashed lines.

For the sake of completeness, it is pointed out that a bending of the display unit 2 is basically also possible in the other direction. Here, too, the housing 3 or its elasticity is particularly decisive for limiting such negative bending.

Figure 4:
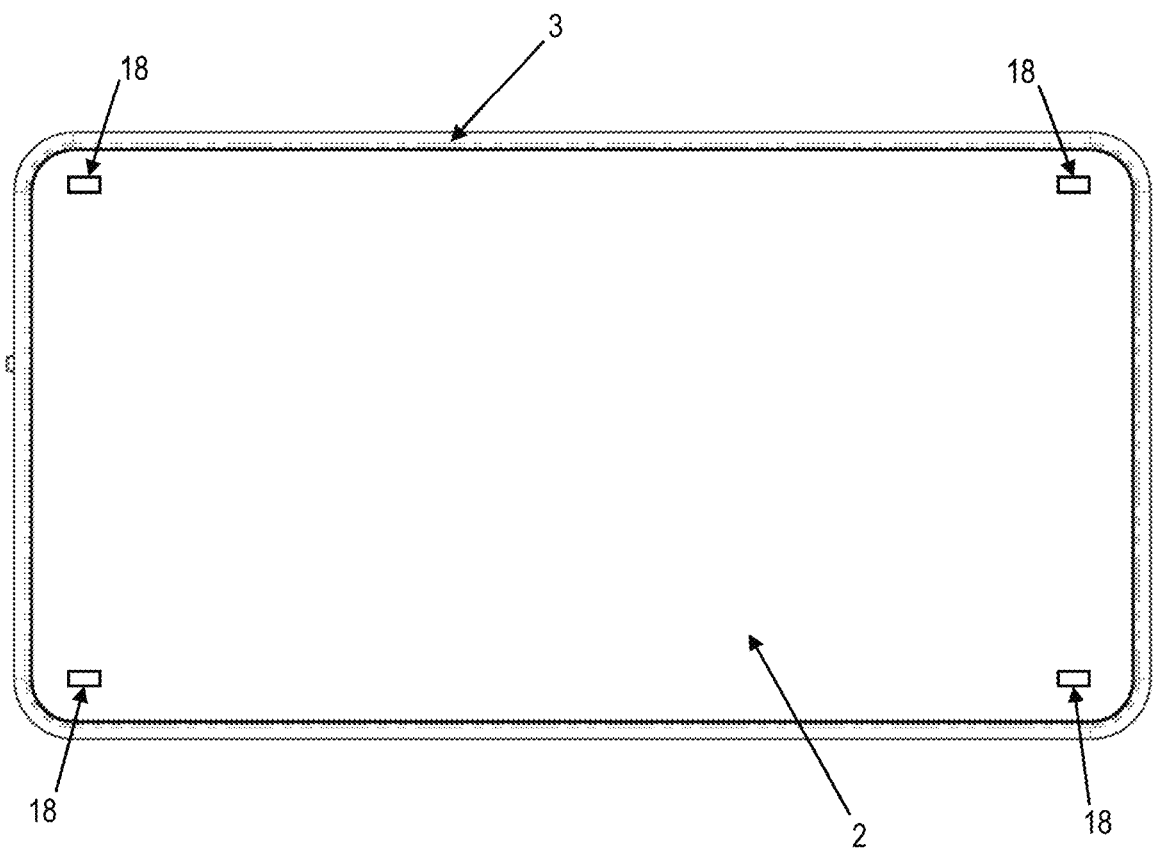

FIG. 4 shows a top view of the front side 5 of an embodiment of the display module 1 according to the invention. In this embodiment, the display unit 2 has infrared units 18 in its corners, which is used to determine the position of the display unit 1 in an interior area.

Figure 5:
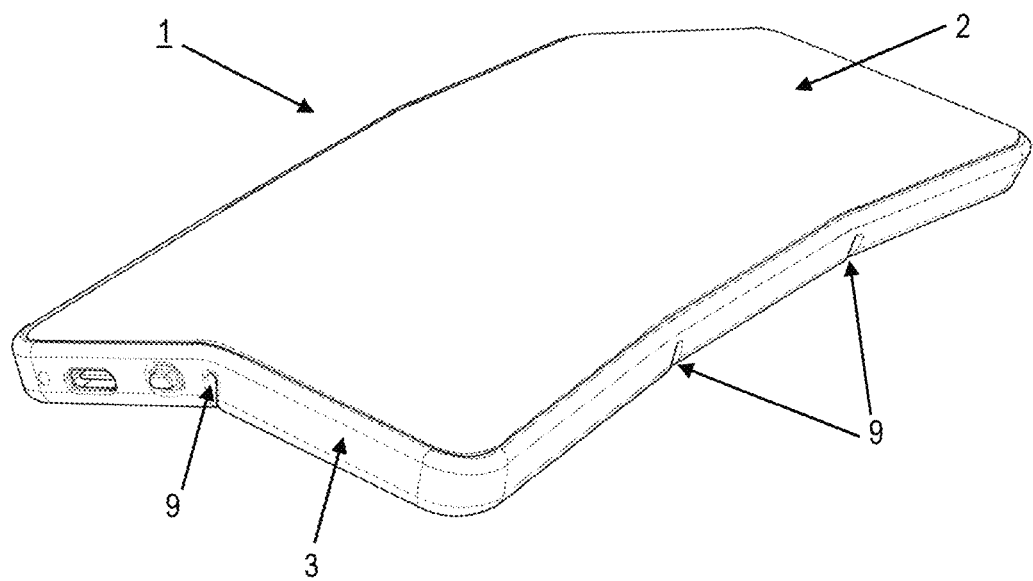

FIG. 5 shows the display module 1 according to the invention in a perspective view, whereby the housing 3 is bent or buckled to the maximum extent in the recesses 9 provided for this purpose. As a result, the housing 3 and the flexible display unit 2 are bent in sections. Within the maximum bending angle 14 (see FIG. 3 and the explanations in the description of FIG. 3), the housing 3 with the flexible display unit 2 can adapt very well to externally specified curvatures (e.g. to body curvatures).

Figure 6:
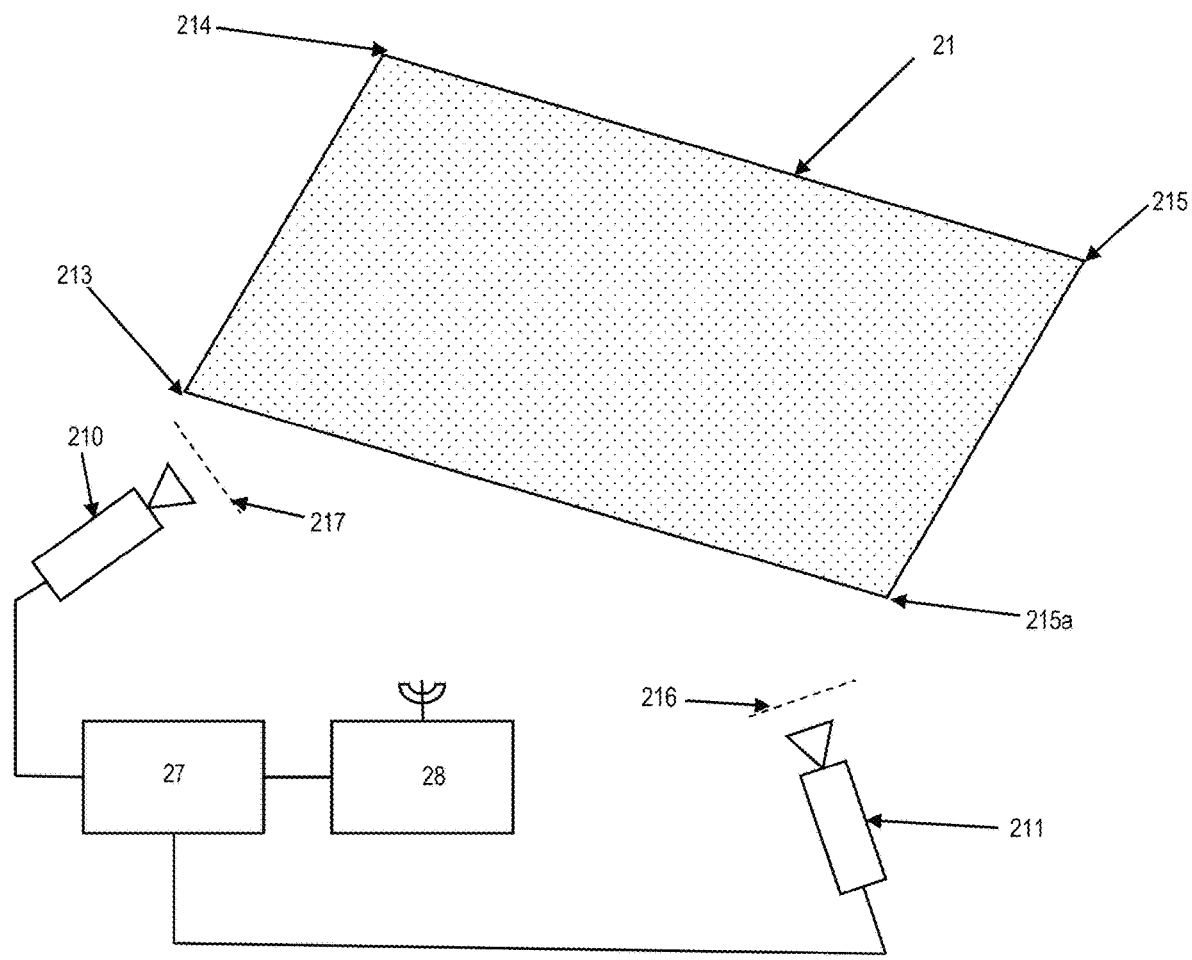

FIG. 6 shows a schematic representation of a display system according to the invention, comprising a projection surface 21 with a plurality of movable display modules 1 as well as a central computing unit 27, a data transfer unit 28 and two image acquisition units 210 and 211.

The display modules 1 located within the projection surface 21 form a large screen, the individual display modules 1 being picture elements or pixels of the large screen. In this regard, the projection surface 21 may be a part of a grandstand or other spectator area of an event venue, which is, for example, a sports stadium, a theater, or a concert hall. It is envisaged that each event visitor will wear a display module 1, although this is not mandatory.

The internal structure of the display modules 1 will be further explained with reference to a block diagram shown in FIG. 7.

For correct image generation on the projection surface 21, the positions of the pixels, i.e. the display modules 1, in the projection surface 21 must be known. For this purpose, in addition to a corresponding design of the display modules, the operatively connected central computing unit 27, the data transfer unit 28 and the two image acquisition units 210 and 211 are provided. It is pointed out that it is not necessary that two image acquisition units 210, 211 be present. Embodiments of the present invention with a single image acquisition unit or with a plurality of image acquisition units, in particular with more than two image acquisition units, are also conceivable. The use of multiple image acquisition units has the advantage that the positions of the display modules 1 can be determined more robustly and reliably.

Figure 7:
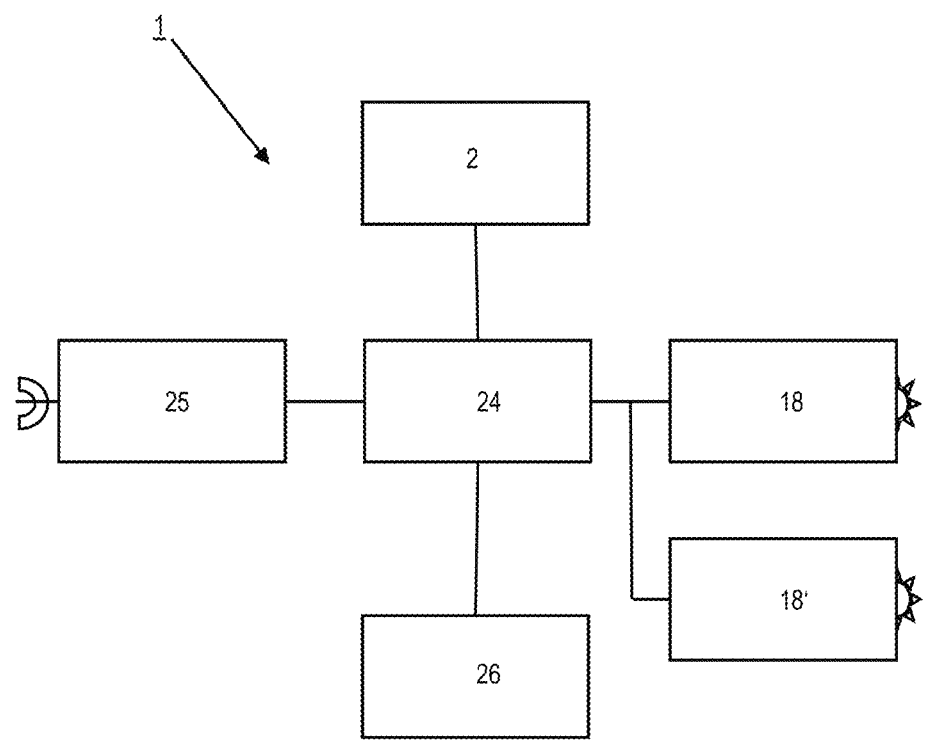

FIG. 7 shows a block diagram of a display module 1 according to the invention, which consists of a display unit 2, a control unit 24, a data transmission unit 25, a battery 15 as power supply unit and at least one infrared unit 18, 18'. These components of the display module 1 are operatively connected to each other and, as far as possible, manufactured in a highly integrated manner in order to be able to obtain a low-cost display module 1 and to be able to keep the overall weight of the display module 1 as low as possible.

In order to keep energy consumption as low as possible or to be able to guarantee operation of the display module 1 for as long as possible, the display unit 2 is realized, for example, by means of LED (light emitting diodes) or an LED matrix. The same applies to the infrared units 18, 18', which are realized with IR diodes.

The data transmission unit 25 can be designed as a pure data receiving unit or as a bidirectional data transmission unit and serves as a communication unit with the data transfer unit 28 (FIG. 6). The information for controlling the display unit 2 is determined or processed, for example, in the central computing unit 27 and transmitted to the data transmission unit 25 via a wireless connection using the data transfer unit 28. Known transmission protocols such as those used for Bluetooth or WLAN (Wireless Local Area Networks) can be used here, for example.

The infrared units 18 or 18' are essential components used to determine the position of the display modules 1. In doing so, the infrared units 18, 18' emit an infrared signal that is not visible to the human eye with an identification code that is unique for the respective display module 1. For example, the infrared unit 9, 9' emits infrared signals in the so-called near infrared, in which the wavelengths are in the range from 700 nm to 1400 nm. In a particular embodiment of the present invention, the wavelength is substantially 940 nm.

The infrared signals emitted by the infrared units 18, 18' are detected by the image acquisition units 210, 211 and processed in the central processing unit 27 to identify the respective display module 1. Accordingly, the image acquisition units 210, 211 are sensitive in the respective infrared spectrum of the infrared emitters, i.e. the corresponding infrared signals of the infrared units 18, 18' can be captured and detected in the image acquisition units 210, 211.

To further improve the sensitivity of the image acquisition units 210, 211, an optical bandpass filter 216, 217 is arranged in front of the respective image acquisition unit 210, 211—i.e. in front of their sensors—in a further embodiment of the present invention. In this way, signals which lie outside the near infrared used by the infrared units 18, 18'—such as, for example, ambient light in the visible range—are strongly attenuated, so that these visible signal components cannot saturate the sensor of the respective image acquisition unit 210, 211, whereby the weaker infrared signals can be amplified more and can thus be better evaluated. Furthermore, an improvement of the sensitivity is also obtained by the fact that the useful signal/interference signal ratio (also called signal-to-interference ratio) becomes larger by using the bandpass filter.

In order to be able to distinguish the individual display modules 1, a unique identification code is assigned to each display module 1. The identification code is embedded in a message sequence—consisting of synchronization sequence, identification code and a checksum. This enables the image acquisition unit 210, 211 to reliably determine the identification codes after receiving them from the infrared unit 18, 18', as will become clear in the following explanations.

Each message sequence starts with the synchronization sequence, which is identical for each display module 1. The aim and purpose of the synchronization sequence is to define the start of the message sequence in order to be able to uniquely detect the start of the message sequence. The synchronization sequence is followed by the identification code, which can now also be detected after the synchronization sequence has been detected. Finally, the checksum (e.g. of the type CRC-16—"cyclic redundancy check") follows, which allows a transmission error to be detected.

The message sequence is used to modulate the intensity of the IR diodes of the infrared unit 18, 18'. For example, on-off keying (OOK) is used as a modulation technique that represents digital data as the presence or absence of the carrier signal. The synchronization sequence is chosen so that it has excellent autocorrelation properties. This makes it easier for the image acquisition unit 210, 211 to detect the synchronization sequence within the received signal and determine the exact position, since the highest correlation value is found only at zero time shift. The length of the synchronization sequence is a tradeoff between autocorrelation performance and message duration. On the one hand, the more chips used for the synchronization sequence, the better the autocorrelation property. On the other hand, a longer synchronization sequence increases the message duration. Furthermore, the speed at which a position of a display module 1 can be calculated decreases. For example, the synchronization sequence comprises 48 chips and is created using an algorithm based on heuristic search, as described, for example, in the paper by authors M. Dimitrov, T. Baitcheva, and N. Nikolov entitled "Efficient Generation of Low Autocorrelation Binary Sequences" (IEEE Signal Processing Letters, vol. 27, pp. 341-345, 2020).

Furthermore, the number of on- and off-bits in the synchronization sequence was intentionally chosen to be equal in order to avoid correlation deviation caused by the brightness of the background. The same property is achieved for the remaining bits (i.e., the identification code and checksum) by using a technique called binary offset carrier (BOC) modulation. In BOC modulation, the data bits are multiplied by a binary carrier signal that can have two, three, or more half-periods per bit. All carriers with an even number of half-periods have the same number of on and off parts (also called chips). For example, a "BOC Sine-2 modulation" (also called Manchester code) with two half-periods per bit is used.

The identification code, for example, is specified with 24 bits, so that a total of 16 million unique identification codes can be used. Together with the 16 bits of the CRC-16 checksum, this results in a total of 24+16=40 bits or 80 chips when using BOC Sine 2 modulation. Thus the entire message consists of 48+80=128 chips.

In FIG. 6, the image acquisition units 210 and 211 are connected to the central processing unit 27 by a wire connection. An alternative embodiment of the present invention provides that the image capturing units 210 and 211 are connected to the central processing unit 27 by means of a wireless connection.

The image acquisition units 210 and 211 are used to capture film sequences with, for example, a frame size of 1640×1232 pixels and a frame rate of 30 frames per second.

The frame rate of the image acquisition units 210 and 211 also determines the maximum allowable chip rate that the infrared units 18, 18' can use to transmit its message. If all infrared units 18, 18' are theoretically perfectly synchronized with the image acquisition unit 210, 211, a single image per transmitted chip would theoretically be sufficient.

If the infrared units 18, 18' are not synchronized with the image acquisition unit 210, 211, the exposure time of an image with two adjacent chips may overlap, resulting in an incorrect amplitude if the two chips are unequal.

It has therefore been shown that the use of three frames per chip can be accepted at the cost of a small loss of amplitude. With a frame rate of 30 frames per second, three frames per chip and a total number of 128 chips for a message, the total duration of a message is 12.8s.

Figure 8:
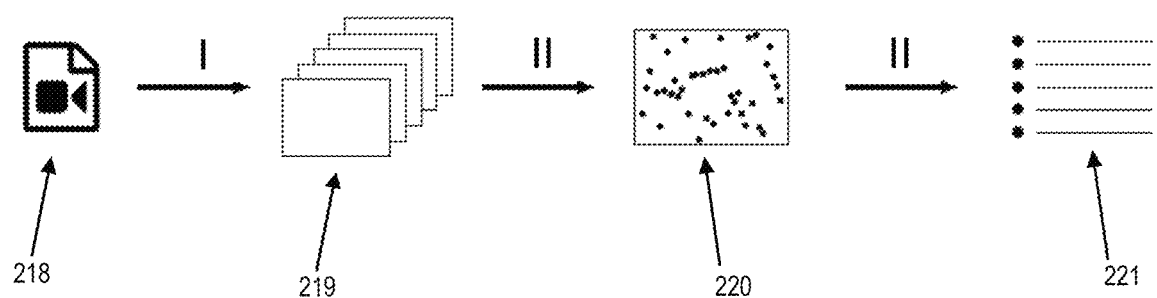

The video file 218 recorded by the image acquisition unit 210, 211 described above is processed on the central computer unit 27 to obtain a list of all valid messages from the infrared units 18, 18' present in the video file 218. This is done in several steps I to III, which are explained below with reference to FIG. 8.

The first step I is to extract all frames from the video file 218 and store them as a multi-dimensional array 219 ("array of frames" or "sequence of frames" or "series of frames"). This facilitates calculations applied to all frames. In order to reduce the memory requirement, each individual image can, for example, be reduced in size by reduction (so-called "pixel binning").

In a simplified embodiment of the present invention, the video sequences captured by the image acquisition units 210, 211 are processed directly into the multi-dimensional rows 219, i.e., storage of the video sequences in the aforementioned video files is not performed.

The second step II is to search for a synchronization sequence at each pixel position. This is done by cross-correlating the synchronization sequence with the values of a pixel along all frames. Here, the calculation of the cross-correlation is proposed using the Fast Fourier Transform (FFT), since it speeds up the calculations considerably. Then, the highest absolute correlation value of each pixel is compared with a threshold value corresponding to the correlation value of a pixel with the minimum allowed signal amplitude. In this way, only the image points with a higher probability are considered.

In this approach, it is assumed that the display module 1 remains in approximately the same location (i.e., equally illuminated pixels) for the duration of a message sequence. The result of this processing step is a list of pixels that can be considered as possible candidates with a valid message sequence.

In the third step III the message sequences are extracted and decoded to check the checksum for all message sequences. As a result, a list is returned containing the pixel coordinates, the message sequences and the estimated signal amplitude for each pixel.

Once the pixel coordinates of the detected infrared units 18, 18' are known, they can be transformed into position coordinates within the projection surface 21, whereby the underlying geometric problem in the projection surface 21 under consideration can often be simplified, because after all the possible positions of the display modules 1 are limited to positions in a stage where spectators can be present. For example, spectators can move freely on a stand, which means that the whole or at least a part of the stand can be considered as a geometric plane. Thus, the transformation problem is to relate a point on the image plane (within the image acquisition unit 210, 211) to a point on the plane of the projection surface 21. In image processing, the relationship between any two planes in space is called homography, which is explained, for example, in "Basic Concepts of the Homography explained with Code" (OpenCV, downloadable at: https://docs.opencv.org/4.x/d9/dab/tutorial_homography.html).

The position (x, y) of one plane can be transformed into the position (x', y') of the other plane with the homography matrix M.

The homography matrix H can be calculated using at least four known reference points 213, 214, 215, 215a between the two planes. In practice, for example, the four corners of a projection surface 21 may be considered as reference points 213-215, 215a and may be temporarily equipped with infrared units 18, 18', for example. The known positions of the reference points 213-215, 215a and the image point coordinates from the image can then be used to compute the matrix H. As long as the respective image acquisition unit 210, 211 is aligned in the same way, the homography matrix remains valid and the reference points 213-215, 215a are no longer needed.

It has been shown that the display system according to the invention provides extremely robust and accurate results with regard to the position of the movable display modules 1. Positional inaccuracies of 4 cm on average could be determined over larger distances, which is extremely small considering an average distance between two display units 1 of 60 cm. Accordingly, with the display system according to the invention, large screens can be realized without further ado at large events. It has proved particularly advantageous if the display modules 1 with all their components are integrated in a cap, in particular an umbrella cap, and are thus handed over to the spectators to be worn during the event.

The electronic components 7 in the display module 1 are intended to realize a number of functions. Together with the batteries 15 or accumulator packs, this results in an extremely powerful and independent display module 1 which can be used for a large number of applications.

The following functions can be implemented individually or in combination in the electronic components together with suitable software, which is available as standard:

Wireless data transmission, for example, according to the Wifi standard 2.4 GHZ;

Bluetooth Low Energy with pairing option to multiple devices equipped with Bluetooth interfaces;

Three-axis gyroscope;

Three-axis accelerometer;

Gesture recognition, including support from machine-learning algorithms;

Microphone for sound recording and processing using machine-learning algorithms;

Cryptographic co-processor for secure encryption and transmission of data;

Data storage;

Infrared precision location, preferably indoors;

USB-C charging port for the batteries 15;

4G and/or 5G communication modules for mobile communication over existing public or private communication networks;

Temperature sensors;

The display module 1 according to the invention can be used for wearing in caps, wristbands, helmet covers, safety vests, work clothes, just to name a few applications. In this context, the display module 1 can also be worn behind textiles, because the extremely powerful display unit 2 can achieve a luminance of up to 6400 nits, which in SI units corresponds to a value of 6400 candela per square meter (cd/m2).

REFERENCE SIGNS 1 display module
2 display unit
3 housing
4 rear side of the housing
5 front side of the housing
6 interior space
7 electronic components
8 boundaries
9 recess
10 angle range
11 recess depth
12 thickness of the housing
13 width of the recess
14 deflection angle
15 battery, power supply unit
16 flexible electrical connection
17 apex
18, 18' infrared unit
21 projection area
23 lighting medium
24 control unit
25 data transmission unit
27 central processing unit
28 data transfer unit
210, 211 image acquisition unit
213-215, 215a reference points
216, 217 bandpass filter
218 video file or video source
219 frame array (array of frames)
220 pixels with high correlation values
221 pixel list with valid messages

The invention claimed is:

1. Display module having a flexible display unit and a housing having a rear side and a front side, the flexible display unit being arranged on the front side of the housing, wherein the housing has a plurality of internal spaces for accommodating electronic components, wherein the housing is flexible at least along boundaries of the internal spaces, wherein the housing has recesses on the rear side which extend at least partially over the rear side, as a result of which the housing with the display unit can be bent within a predefined angular range along the recesses, characterized in that the recesses form a matrix with two rows and three columns with corresponding internal spaces.

2. Display module according to claim 1, characterized in that the recesses extend over an entire rear side of the housing.

3. Display module according to claim 1, characterized in that the housing is rectangular and that the recesses run parallel to side walls of the housing.

4. Display module according to claim 3, characterized in that the internal spaces are of equal size.

5. Display module according to claim 1, characterized in that the recesses have a depth corresponding to 50% to 90%, preferably 60% to 80%, preferably 75% of a mean thickness of the housing.

6. Display module according to claim 1, characterized in that the recesses on a back have a width which allows a maximum bending angle of the front of the housing of 35°.

7. Display module according to claim 1, characterized in that the internal spaces accommodate at least one of following components:
- electronic components;
- battery;

wherein the components can be connected by means of flexible prints.

8. Display module according to claim 1, characterized in that maximum brightness of the display unit is 6,400 candela per square meter.

9. Display module according to claim 1, characterized in that at least one infrared unit for transmitting infrared signals is additionally arranged on the flexible display unit for displaying information in a visual range.

10. Use of the display module according to claim 1 for wearing in caps, wristbands, helmet covers, safety vests and work clothes, wherein the display module is preferably worn in a pocket made of transparent or partially transparent textile.

* * * * *